(12) United States Patent
Holbrook (10) Patent No.: US 10,197,889 B2
(45) Date of Patent: *Feb. 5, 2019

(54) CAMERA HOUSING FOR REDUCING INTERNAL REFLECTIONS AND CAMERA COMPRISING SAME

(71) Applicant: AVIGILON CORPORATION, Vancouver (CA)

(72) Inventor: Thomas W. Holbrook, Vancouver (CA)

(73) Assignee: AVIGILON CORPORATION, Vancouver (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/609,530

(22) Filed: May 31, 2017

(65) Prior Publication Data

US 2017/0261837 A1 Sep. 14, 2017

Related U.S. Application Data

(63) Continuation of application No. 14/434,729, filed as application No. PCT/US2015/010874 on Jan. 9, 2015.

(Continued)

(51) Int. Cl.
*G03B 15/05* (2006.01)
*G03B 17/02* (2006.01)
(Continued)

(52) U.S. Cl.
CPC ............. *G03B 17/02* (2013.01); *G03B 15/05* (2013.01); *G03B 17/12* (2013.01); *H04N 5/2254* (2013.01); *H04N 5/2256* (2013.01)

(58) Field of Classification Search
None
See application file for complete search history.

(56) References Cited

U.S. PATENT DOCUMENTS

| 6,850,025 | B1 | 2/2005 | Paolantionio et al. |
| 6,913,403 | B2 | 7/2005 | Paolantionio et al. |

(Continued)

FOREIGN PATENT DOCUMENTS

| CN | 102918543 A | 2/2013 |
| WO | WO 2008/017857 A1 | 2/2008 |

(Continued)

*Primary Examiner* — Clayton E. LaBalle
*Assistant Examiner* — Dennis Hancock
(74) *Attorney, Agent, or Firm* — Baker & Hostetler LLP (57) ABSTRACT

A camera includes a camera housing with a housing wall demarcating the interior of the camera housing, an optical aperture and a lenslet aperture extending through the housing wall, and an opaque blocking wall adjoined to and extending inwardly from the housing wall and circumscribing the lenslet aperture; a lenslet in the lenslet aperture aligned with an on-camera light source; a lens contained within the camera housing and aligned with the optical aperture to receive light entering the camera housing through the optical aperture; an imager within the camera housing and aligned with the lens to capture light passing through the lens; and circuitry contained within the camera housing communicative with the imager and operable to operate the camera. The circuitry includes a printed circuit board that abuts the opaque blocking wall and on which is mounted a light source positioned to be circumscribed by the opaque blocking wall.

20 Claims, 9 Drawing Sheets

Related U.S. Application Data

(60) Provisional application No. 61/926,214, filed on Jan. 10, 2014.

(51) Int. Cl.
  *G03B 17/12* (2006.01)
  *H04N 5/225* (2006.01)

(56) References Cited

U.S. PATENT DOCUMENTS

| | | |
|---|---|---|
| 7,380,997 B2 | 6/2008 | Takahashi et al. |
| 7,440,025 B2 | 10/2008 | Cheng |
| 2004/0169771 A1 | 9/2004 | Washington et al. |
| 2005/0206780 A1 | 9/2005 | Iwasaki et al. |
| 2006/0008266 A1* | 1/2006 | Kawakami ............ G03B 15/05 396/175 |
| 2006/0077649 A1 | 4/2006 | Kumagai et al. |
| 2006/0216020 A1 | 9/2006 | Lang et al. |
| 2008/0112700 A1* | 5/2008 | Foxenland ............ G03B 17/06 396/148 |
| 2010/0013984 A1 | 1/2010 | Loiacono |
| 2013/0062228 A1 | 3/2013 | Danilov |
| 2014/0197314 A1* | 7/2014 | Afrooze ............ H05B 33/0842 250/338.1 |
| 2014/0198218 A1 | 7/2014 | Afrooze et al. |

FOREIGN PATENT DOCUMENTS

| | | | |
|---|---|---|---|
| WO | WO 2008017857 A1 * | 2/2008 | ....... G08B 13/19619 |
| WO | WO 2013/072231 A1 | 5/2013 | |

* cited by examiner

PRIOR ART

CAMERA HOUSING FOR REDUCING INTERNAL REFLECTIONS AND CAMERA COMPRISING SAME

CROSS-REFERENCE TO RELATED APPLICATION

This application is a continuation of U.S. patent application Ser. No. 14/434,729, filed Apr. 9, 2015, which is a National Stage of International Application No. PCT/US2015/010874, filed Jan. 9, 2015, which claims the benefit of U.S. Provisional Patent Application No. 61/926,214, filed Jan. 10, 2014, the disclosures of which are incorporated herein by reference in their entireties.

TECHNICAL FIELD

The present disclosure is directed at a camera housing having walls for reducing internal reflections and a camera comprising the camera housing.

BACKGROUND

Certain types of cameras include a light source for illuminating regions of interest that the cameras are to monitor. For example, some cameras are able to sense infrared (IR) and visible light and are correspondingly equipped with an on-camera IR and/or visible light sources for use in low-light conditions. In order for one of these cameras to properly monitor what is happening in a region of interest, the camera's image sensor should only detect light emanating from the region of interest as opposed to, for example, light from the on-camera IR or other light source that are reflected by internal components of the camera itself.

SUMMARY

According to a first aspect, there is provided a camera, comprising a camera housing, which itself comprises (i) a housing wall demarcating the interior of the camera housing; (ii) an optical aperture and a lenslet aperture extending through the housing wall; and (iii) an opaque blocking wall adjoined to and extending inwardly from the housing wall and circumscribing the lenslet aperture; a lenslet in the lenslet aperture aligned with an on-camera light source; a lens contained within the camera housing and aligned with the optical aperture to receive light entering the camera housing through the optical aperture; an imager contained within the camera housing and aligned with the lens to capture light that has passed through the lens; and circuitry contained within the camera housing communicatively coupled with the imager and operable to operate the camera, the circuitry comprising a printed circuit board (PCB) that abuts against the opaque blocking wall and on which is mounted a light source positioned to be circumscribed by the opaque blocking wall.

The lenslet aperture may comprise a first wide angle lenslet aperture, the lenslet may comprise a first wide angle lenslet, and the opaque blocking wall may comprise a first opaque wide angle lenslet blocking wall. The camera housing may further comprise a first narrow angle lenslet aperture; and a first opaque narrow angle lenslet blocking wall adjoined to and extending inwardly from the housing wall and circumscribing the first narrow angle lenslet aperture. The PCB may abut against the first opaque narrow angle lenslet blocking wall and have mounted on it the light source positioned to be circumscribed by the first narrow angle lenslet blocking wall. The camera may further comprise a first narrow angle lenslet in the first narrow angle lenslet aperture.

The opaque narrow and wide angle lenslet blocking walls may directly contact each other.

The camera housing may further comprise a second wide angle lenslet aperture and a second narrow angle lenslet aperture; and a second opaque wide angle lenslet blocking wall and a second opaque narrow angle lenslet blocking wall, wherein the second opaque wide and narrow angle lenslet blocking walls may be adjoined to and extend inwardly from the housing wall and circumscribe the second wide angle and narrow angle lenslet apertures, respectively, and wherein the PCB may abut against the second opaque wide and narrow angle lenslet blocking walls and have mounted on it additional light sources positioned to be circumscribed by the second opaque wide and narrow angle lenslet blocking walls. The camera may further comprise a second wide angle lenslet and a second narrow angle lenslet in the second wide and narrow angle lenslet apertures, respectively.

The first and second wide angle lenslet apertures may be on left and right sides of the optical aperture, respectively.

The second opaque narrow and wide angle lenslet blocking walls may directly contact each other and not directly contact the first opaque narrow and wide angle lenslet blocking walls.

The first and second wide angle lenslets may have centers separated by approximately 180°, and the centers of the first and second wide angle lenslets and a center of the optical aperture may be collinear.

The first and second narrow angle lenslets may have centers above and offset approximately 45° from the centers of the first and second wide angle lenslets, respectively.

The wide angle lenslets may be rectangular and the narrow angle lenslets may be circular.

The camera may further comprise a threaded column for receiving a fastener for securing the PCB to the housing wall, and the threaded column may have a height identical to that of the opaque blocking wall and may be adjoined to and extend inwardly from the housing wall.

The threaded column may directly contact the opaque blocking wall.

The camera housing may be gaseously sealed to prevent air from outside the camera from entering the camera housing.

The on-camera light source may include one or more of an infrared light source and a visible light source, or other light sources.

According to another aspect, there is provided a main portion for containing a camera, a lens, and an imager, and a front portion of a camera housing, the front portion comprising: a face and sides extending from the face for joining to a remainder of a camera housing; an optical aperture and a lenslet aperture extending through the face; and an opaque blocking wall of uniform height adjoined to and extending from the face in a direction identical to that in which the sides extend, wherein the opaque blocking wall circumscribes the lenslet aperture.

The lenslet aperture may comprise a first wide angle lenslet aperture, the opaque blocking wall may comprise a first opaque wide angle lenslet blocking wall, and the front portion may further comprise a first narrow angle lenslet aperture; and a first opaque narrow angle lenslet blocking wall adjoined to and extending inwardly from the face, circumscribing the first narrow angle lenslet aperture, and having a height identical to that of the first opaque wide angle lenslet blocking wall.

The opaque narrow and wide angle lenslet blocking walls may directly contact each other.

The front portion may further comprise a second wide angle lenslet aperture and a second narrow angle lenslet aperture; and a second opaque wide angle lenslet blocking wall and a second opaque narrow angle lenslet blocking wall, wherein the second opaque wide and narrow angle lenslet blocking walls may be adjoined to and extend inwardly from the face, respectively circumscribe the second wide angle and narrow angle lenslet apertures, and have a height identical to that of the first opaque wide angle lenslet blocking wall.

The first and second wide angle lenslet apertures may be on left and right sides of the optical aperture, respectively.

The second opaque narrow and wide angle lenslet blocking walls may directly contact each other and not directly contact the first opaque narrow and wide angle lenslet blocking walls.

The first and second wide angle lenslets may have centers separated by approximately 180° and the centers of the first and second wide angle lenslets and a center of the optical aperture may be collinear.

The first and second narrow angle lenslets may have centers above and offset approximately 45° from the centers of the first and second wide angle lenslets, respectively.

The wide angle lenslets may rectangular and the narrow angle lenslets may be circular.

The front portion may further comprise a threaded column for receiving a fastener for securing a printed circuit board (PCB) of the circuitry for operating the camera, the lens, and the aperture to the face, the threaded column may have a height identical to that of the opaque blocking wall and may be adjoined to and extend inwardly from the face.

The threaded column may directly contact the opaque blocking wall.

According to another aspect, there is provided a camera comprising a camera housing, comprising (i) a housing wall demarcating the interior of the camera housing; (ii) an optical aperture extending through the housing wall; (iii) a left wide angle lenslet aperture extending through the housing wall on a left side of the optical aperture and a right wide angle lenslet aperture extending through the housing wall on a right side of the optical aperture; (iv) a left narrow angle lenslet aperture extending through the housing wall on a left side of the optical aperture and a right narrow angle lenslet aperture extending through the housing wall on a right side of the optical aperture, the narrow angle lenslet apertures; and (v) left and right opaque blocking walls adjoined to and extending inwardly from the housing wall, the left opaque blocking wall circumscribing the left wide and narrow angle lenslet apertures and the right opaque blocking wall circumscribing the right wide and narrow angle lenslet apertures, wherein the left and right opaque blocking walls are of uniform height; a lenslet in each of the lenslet apertures, wherein each lenslet is aligned with an on-camera light source; a lens contained within the camera housing and aligned with the optical aperture to receive light entering the camera housing through the optical aperture; an imager contained within the camera housing and aligned with the lens to receive light that has passed through the lens; and circuitry contained within the camera housing communicatively coupled with the imager and operable to operate the camera, the circuitry comprising a printed circuit board (PCB) that abuts against the opaque blocking walls and on which is mounted four light sources, each of which is positioned to direct light through a different one of the lenslet apertures and be circumscribed by one of the opaque blocking walls.

The on-camera light source may include one or more of an infrared light source and a visible light source, or other light sources.

This summary does not necessarily describe the entire scope of all aspects. Other aspects, features, and advantages will be apparent to those of ordinary skill in the art upon review of the following description of specific embodiments.

BRIEF DESCRIPTION OF THE DRAWINGS

In the accompanying drawings, which illustrate one or more example embodiments.

DETAILED DESCRIPTION

Directional terms such as "top", "bottom", "upwards", "downwards", "vertically", and "laterally" are used in the following description for the purpose of providing relative reference only, and are not intended to suggest any limitations on how any article is to be positioned during use, or to be mounted in an assembly or relative to an environment. Additionally, the term "couple" and variants of it such as "coupled", "couples", and "coupling" as used in this description are intended to include indirect and direct connections unless otherwise indicated. For example, if a first device is coupled to a second device, that coupling may be through a direct connection or through an indirect connection via other devices and connections. Similarly, if the first device is communicatively coupled to the second device, communication may be through a direct connection or through an indirect connection via other devices and connections.

One example type of camera that comprises an on-board light source is a camera that is able to illuminate a region of interest using infrared (IR) light and that is able to record and display the IR light that the region of interest reflects. This permits the camera to record images in darkness. A design goal for this type of camera is that the IR light the camera emits and that is reflected back to the camera's imager should be reflected only by the region of interest and not by internal components of the camera itself (reflections off of these internal components are "internal reflections"). Internal reflections can interfere with the camera's ability to identify activity specific to the region of interest. One way the problem of internal reflections is addressed in a conventional camera is by optically isolating the camera's optical aperture, lens, and imager from the on-camera IR light source using a lens chamber. Unfortunately, doing this requires a more complicated and expensive housing and can inhibit airflow across the camera's optical aperture, which promotes condensation in environmental cameras that can be detrimental to image quality.

The same design may also be used with visible light sources or other forms of light sources and light sources may be combined. For example, the primary illumination light source may be IR, while visible on-camera light sources are also utilized, either for object illumination or for other purposes, such as identifying the existence of the camera to observers, providing an indication that the camera is on or recording, or other security purposes. While a visible light source may be used in place of or in conjunction with the IR light sources referenced herein, the remainder of the present disclosure will only refer to IR light sources so as to simplify the present disclosure, with the understanding that the term "IR" may equally refer to visible light or other light sources, alone or in combination with IR.

The embodiments described herein use opaque blocking walls that surround the on-camera light source as opposed to a lens chamber that optically isolates the optical aperture, lens, and imager from the on-camera light source. The opaque blocking walls permit the camera to be designed without a lens chamber, which reduces components and facilitates air flow across the optical aperture and reduces condensation. While in the following example embodiments no fan is used, in alternative embodiments (not depicted) a fan may be used to blow air across the camera and the optical aperture to further reduce condensation, whereas in a camera that comprises a lens chamber this could not be easily done.

Figure 1:
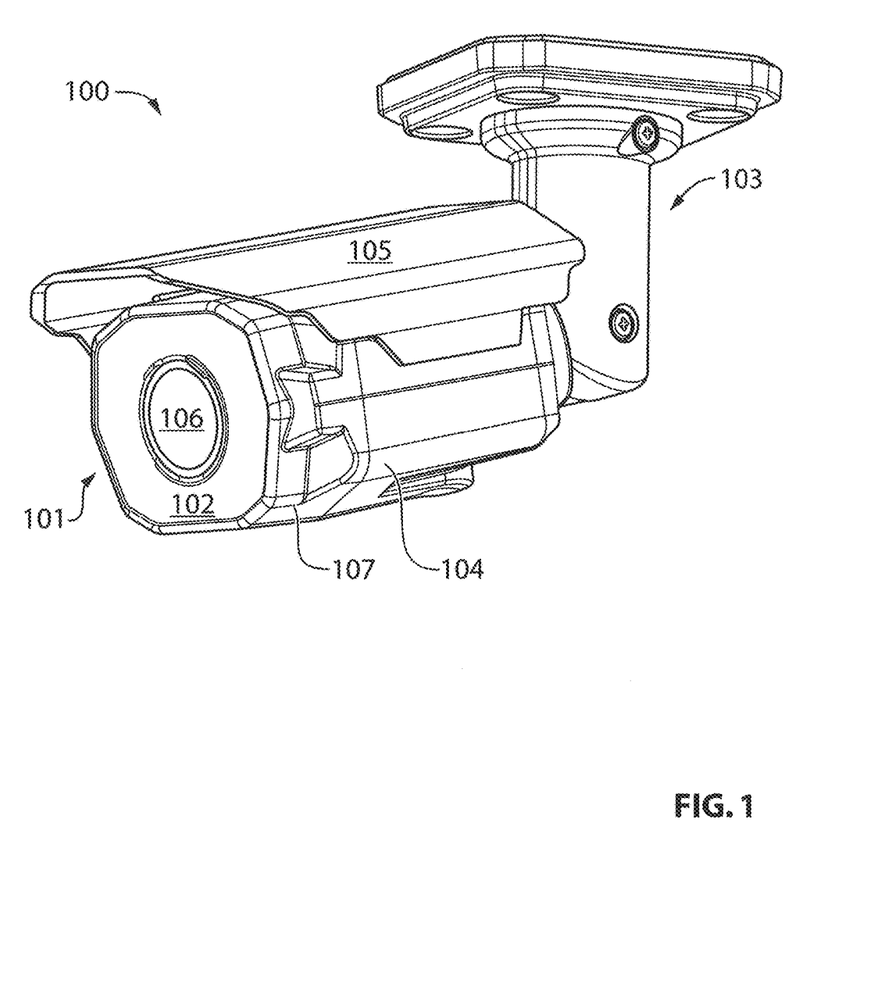
FIG. 1 is a perspective view of a camera assembly comprising a security camera and a mounting arm, according to one embodiment.

Referring now to FIG. 1, there is shown a camera assembly 100 according to a first embodiment. The camera assembly 100 comprises a security camera 101 movably coupled to a mounting arm 103, which is mountable to a mounting surface such as a ceiling or wall (not shown). The camera assembly 100 also comprises a sun shroud 105 slidably coupled to the top of the camera 101. Additionally, while the camera 101 in FIG. 1 is a bullet camera, alternative embodiments (not depicted) may comprise a different type of camera, such as a dome camera.

The camera 101 itself comprises a camera housing 104 comprising a housing wall that demarcates the interior of the camera 101 from the camera's 101 environment. A front portion 107 of the camera housing 104 comprises, at its front, a substantially flat face 301 (shown in FIGS. 3 and 4). At the center of the face 301 is an optical aperture 106 through which light from the environment enters the camera 101. Around the optical aperture 106 and overlaid on the face 301 is a tinted window 102 that hides the on-camera light source, as discussed in more detail below.

Figure 2:
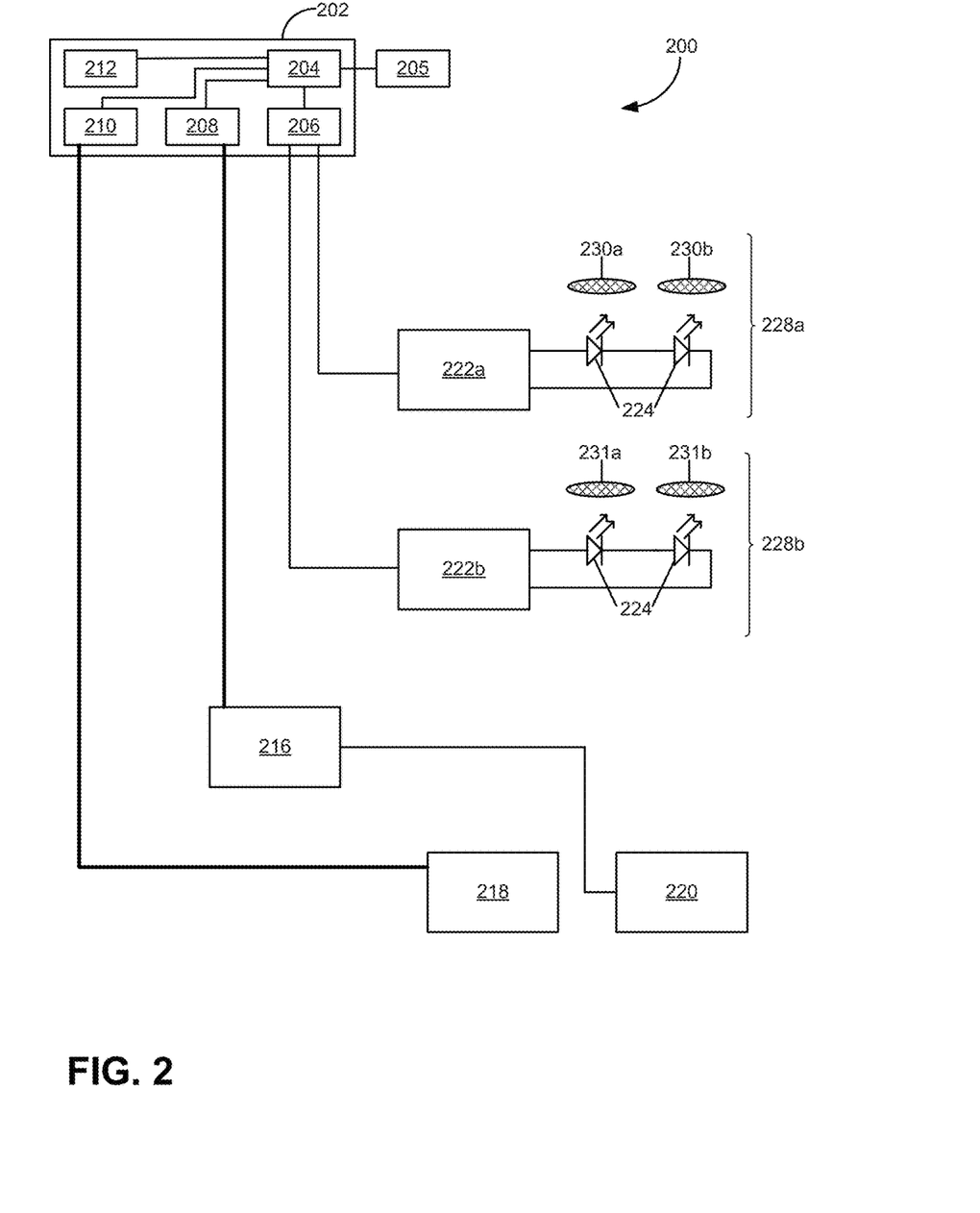
FIG. 2 is a block diagram of an imaging apparatus that comprises part of the security camera.

Referring now to FIG. 2, there is shown a block diagram of an imaging apparatus 200 that also comprises part of the camera 101. The imaging apparatus 200 comprises a system on a chip 202 (hereinafter "SoC 202"), which includes a processor 204 that is communicatively coupled to each of the SoC's 202 other components: an image signal processor 210, a media access controller 212, general purpose input/output (GPIO) lines 206, and an I²C interface 208. The processor 204 is also communicatively coupled to memory 205 that is external to the SoC 202. Encoded on to the memory 205 is program code that the processor 204 can execute to operate the camera 101.

The imaging apparatus 200 also comprises a lens driver 216 communicatively coupled to the I²C interface 208, a zoom lens 220 mechanically coupled to the lens driver 216, an imager 218 communicatively coupled to the image signal processor 210, and a pair of current drivers 222a,b (collectively, "current drivers 222") each electrically coupled to a different one of the GPIO lines 206. Each of a pair of IR emitters 228a,b (collectively, "IR emitters 228") is electrically coupled to a different one of the current drivers 222 and emits IR light when driven by the current drivers 222. One of the IR emitters 228 produces an IR beam having a wide angle linear profile (hereinafter "wide angle emitter 228a") while the other of the IR emitters 228 produces an IR beam having a narrow angle linear profile (hereinafter "narrow angle emitter 228b"). The imager 218 is configured to capture light in the infrared spectrum and can be, for example, a digital sensor such as a complementary metal-oxide-semiconductor (CMOS) sensor. The specifications of the imager 218 and the zoom lens 220 can be selected based on an operator's requirements and performance expectations.

While FIG. 2 shows an embodiment with only a pair of the IR emitters 228, other embodiments (not depicted) can feature more than two of the IR emitters 228, any one or more of them producing an IR beam of a different linear profile, and which can be combined to produce an IR beam with a variable linear profile.

Each of the IR emitters 228 in this embodiment respectively comprises a set of infrared emitting diodes (IREDs) 224, each of which acts as an on-camera IR light source. An example of these IREDs 224 are a pair of Osram™ SFH4715S IREDs. The wide angle emitter 228a further comprises a right wide angle lenslet 230a and a left wide angle lenslet 230b (collectively, "wide angle lenslets" 230) and the narrow angle emitter 228b analogously further comprises a right narrow angle lenslet 231a and a left narrow angle lenslet 231b (collectively, "narrow angle lenslets" 231). The wide angle lenslets 230 are configured to shape the IRED emission into an IR beam with a linear profile that is relatively widely dispersed, and the narrow angle lenslets 231 are configured to shape the IRED emission into an IR beam with a linear profile that is relatively narrowly dispersed. Examples of these lenslets 230,231 are those provided by Ledil Oy™ based in Finland.

The current drivers 222 are designed to regulate the current delivered to the IR emitters 228. The current drivers 222 can be controlled to deliver all available power to one or the other of the IR emitters 228, or to vary the power ratio between the two IR emitters 228. The current drivers 222 may each be, for example, the AL8805 Buck LED Driver by On Semiconductor™. This program code stored on the memory 205 includes instructions for sending a control signal from the SoC along two of the GPIO lines 206 to the current drivers 222 to produce the IR beam.

Figure 3:
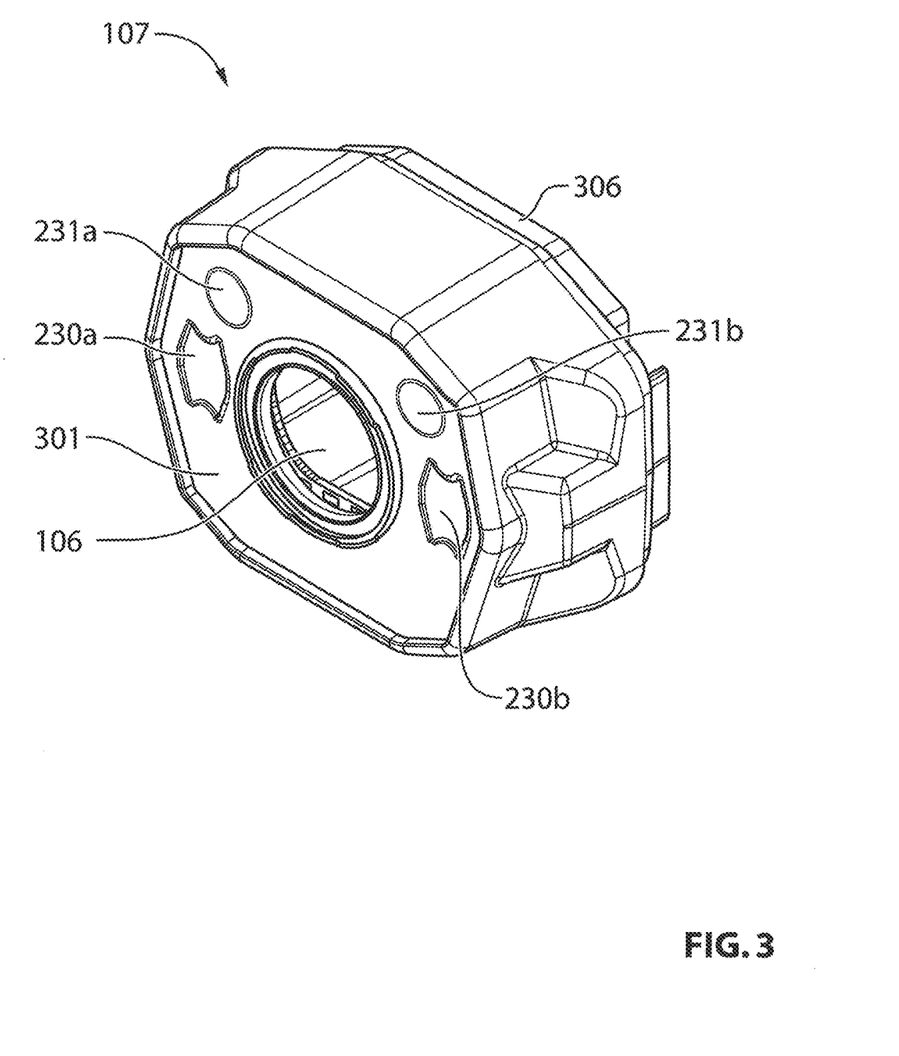
FIG. 3 is a perspective view of a front portion of a camera housing that comprises part of the security camera.
Figure 4:
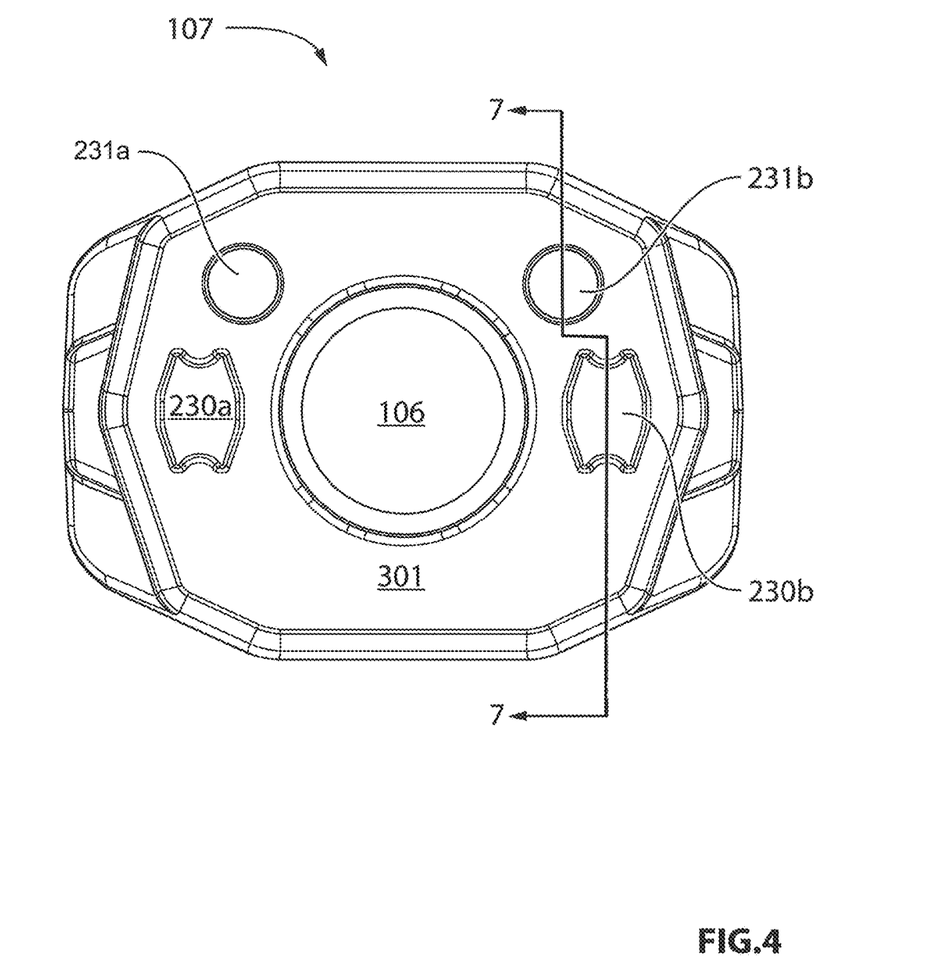
FIG. 4 is a front elevation view of the front portion of the camera housing.

FIGS. 3 and 4 respectively depict perspective and front elevation views of the front portion 107 of the camera housing 104 with the tinted window 102 removed, revealing the front portion's 107 face 301. Extending rearwardly from the front portion's 107 rear edge is a lip 306 that fits within a corresponding groove in the front edge of the remainder of the camera housing 104 (not shown). The optical aperture 106 is in the middle of the face 301 and its center is located along the front portion's 107 longitudinal axis. The left and right wide angle lenslets 230*a,b* extend through the face 301 on the optical aperture's 106 left and right sides, respectively, with the optical aperture's 106 center and the centers of the wide angle lenslets 230 being collinear. The narrow angle lenslets 231*a,b* are circular and respectively extend through the face 301 above the wide angle lenslets 230*a,b*. Relative to the center of the optical aperture 106, the centers of the left wide and narrow angle lenslets 230*a*,231*a* and of the right wide and narrow angle lenslets 230*b*,231*b* are respectively offset by approximately 45°.

Figure 5:
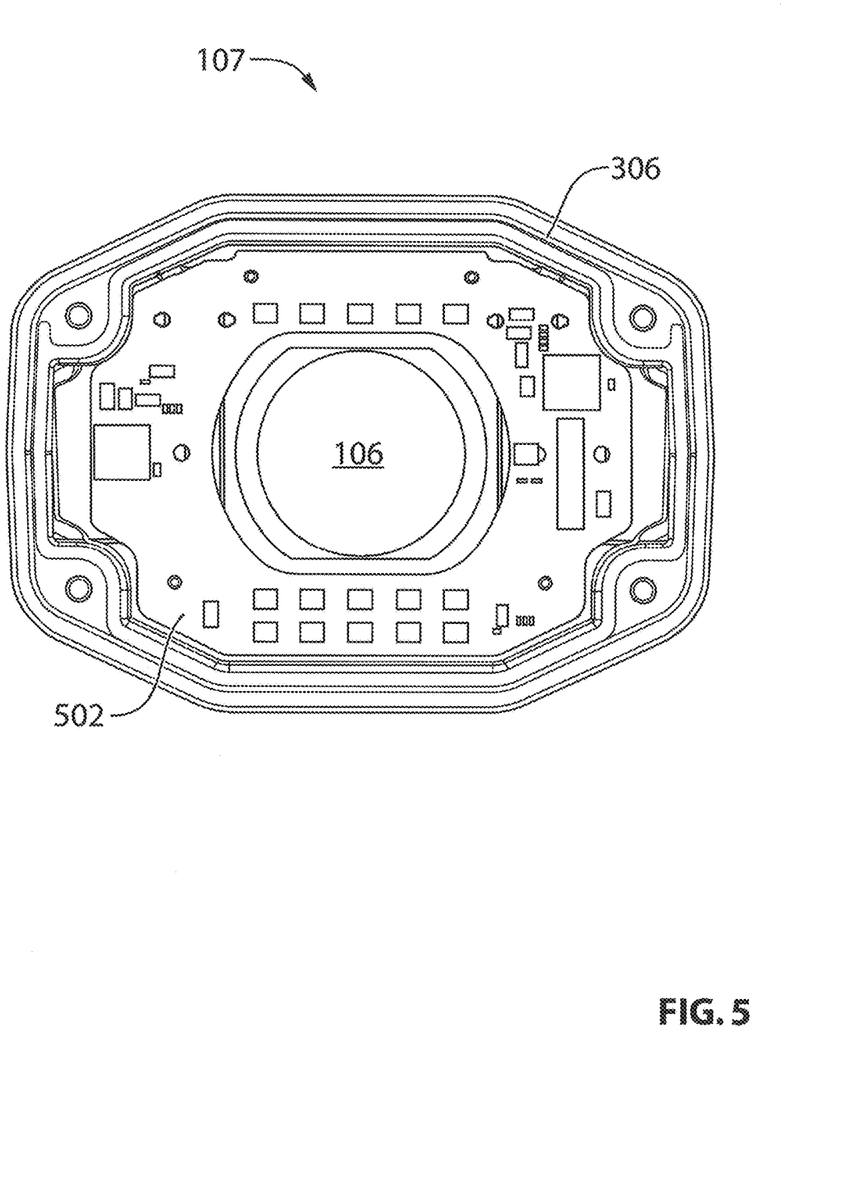
FIG. 5 is a rear elevation view of the front portion of the camera housing showing a printed circuit board (PCB) attached to a rear side of the front portion.

Attached to a rear side of the front portion 107 is a PCB 502, which is visible in the rear elevation view of FIG. 5 and on which the current drivers 222, IR emitters 228, IREDs 224, and lenslets 230,231 are mounted. The lenslets 230,231 are mounted to the PCB 502 on top of the IREDs 224. The SoC 202, memory 205, lens driver, and imager are mounted on other PCBs (not shown) located elsewhere in the camera housing 104. As discussed in further detail below, the PCB 502 is mounted to the front portion 107 so that it is parallel with the face 301. While in the present embodiment the lenslets 230,231 are directly connected to the PCB 502, in alternative embodiments (not depicted) the lenslets 230,231 may be mounted, for example, directly to the housing 104 and be only indirectly connected to the PCB 502.

Figure 6A:
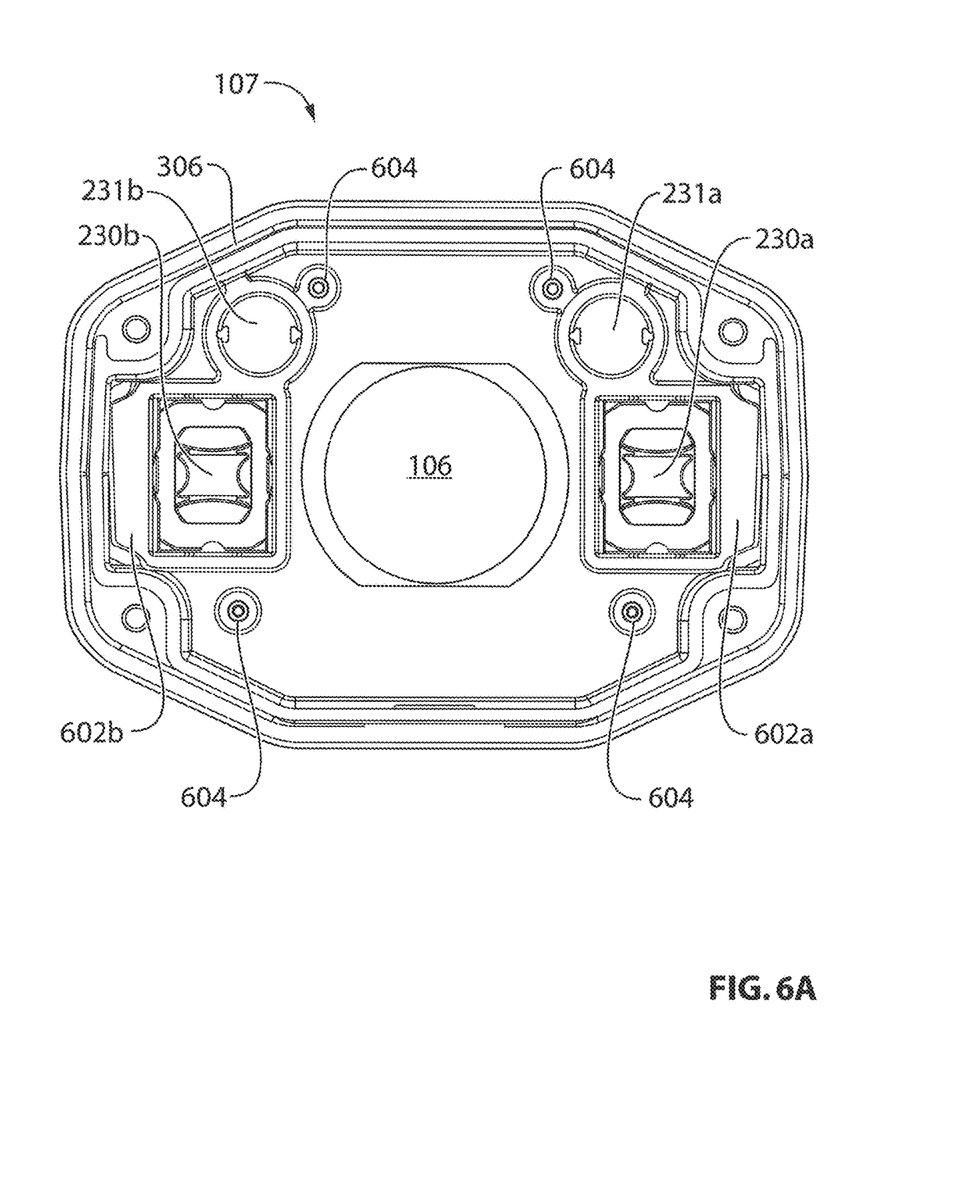
FIGS. 6A and 6B are rear elevation views of the front portion of the camera housing with and without lenslets, respectively.
Figure 6B:
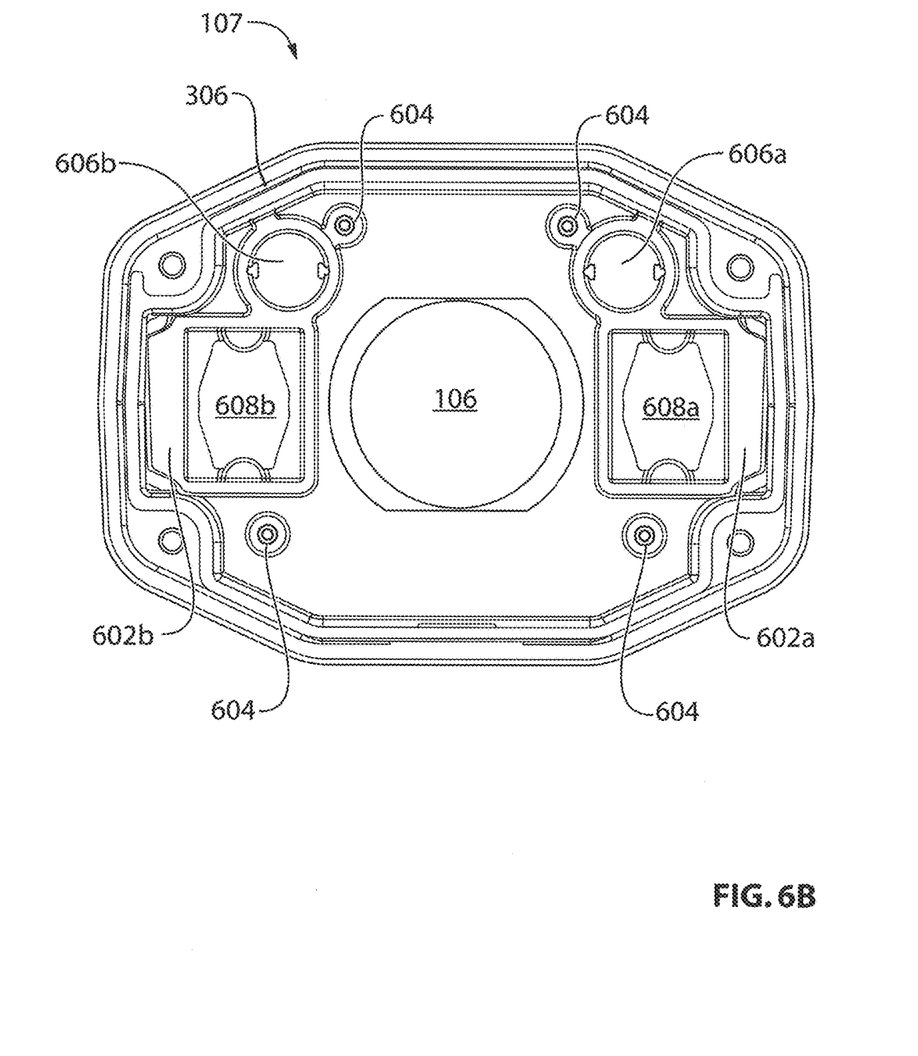

FIG. 6A is a rear elevation view of the front portion 107 and the lenslets 230,231. Visible in FIG. 6 on the rear side of the front portion 107 are left and right IR blocking walls 602*a,b* (collectively, "blocking walls" 602). FIG. 6B is a rear elevation view of the front portion 107 in isolation (i.e. with the lenslets 230,231 removed) to reveal left and right wide angle lenslet apertures 606*a,b* and left and right narrow angle lenslet apertures 608*a,b* through which the lenslets 230*a,b* and 23*a,b*, respectfully, extend when they are in place.

The right blocking wall 602*b* comprises a rectangular portion that circumscribes the right wide angle lenslet aperture 606*b* (and, in FIG. 6A, the right wide angle lenslet 230*b*) and a circular portion that circumscribes the right narrow angle lenslet aperture 608*b* (and, in FIG. 6A, the left wide angle lenslet 230*a*) (the rectangular portion is the "right wide angle lenslet blocking wall" and the circular portion is the "right narrow angle lenslet blocking wall"). The right wide angle and narrow angle lenslet blocking walls merge and directly contact each other in an area between the right lenslet apertures 606*b*,608*b*. The left blocking wall 602*a* comprises a rectangular portion that circumscribes the left wide angle lenslet aperture 606*a* (and, in FIG. 6A, the left wide angle lenslet 230*a*) and a circular portion that circumscribes the left narrow angle lenslet aperture 608*a* (and, in FIG. 6A, the left narrow angle lenslet 231*a*) (the rectangular portion is the "left wide angle lenslet blocking wall" and the circular portion is the "left narrow angle lenslet blocking wall"). The left wide angle and narrow angle lenslet blocking walls merge and directly contact each other in an area between the left wide and narrow angle lenslet apertures 606*a*,608*a*. The blocking walls 602 are made of an opaque material, which in the depicted embodiment is aluminum, but which in other embodiments may be another opaque material such as an opaque plastic or steel. In the depicted embodiment the blocking walls 602 extend to meet the PCB's 502 surface when the PCB 502 is mounted to the front portion 107. To prevent light leakage, the blocking walls 602 and the rear side of the face 301 abut against each other. For example, the blocking walls 602 and the face 301 in the depicted embodiment are made from a single piece of die-cast metal. In alternative embodiments (not depicted), the blocking walls 602 and the face 301 may be formed from separate pieces of metal but be welded together along the blocking walls' 602 edges, the blocking walls 602 and face 301 may be adhered together, or the blocking walls 602 and face 301 may be pressed together and held in place using screws or other fasteners. Regardless, the intersection between the blocking walls 602 and the face 301 is optically non-transmissive to prevent light from the IREDs 224 from escaping from between them.

Also extending from the rear of the face 301 are four threaded columns 604, each with a height identical to that of the blocking walls 602 and having an interior threaded to receive one of four fasteners in the form of screws 504 used to secure the PCB 502 to the face 301. To mount the PCB 502 to the face 301, the PCB 502 is positioned so that screw holes extending through the PCB 502 are aligned with the threaded columns 604 and the PCB 502 is then screwed to the face 301. As the columns 604 are the same height as the blocking walls 604, screwing the PCB 502 tightly against the columns 604 also, ideally, eliminates any gaps between the PCB 502 and the blocking walls 604.

Figure 7:
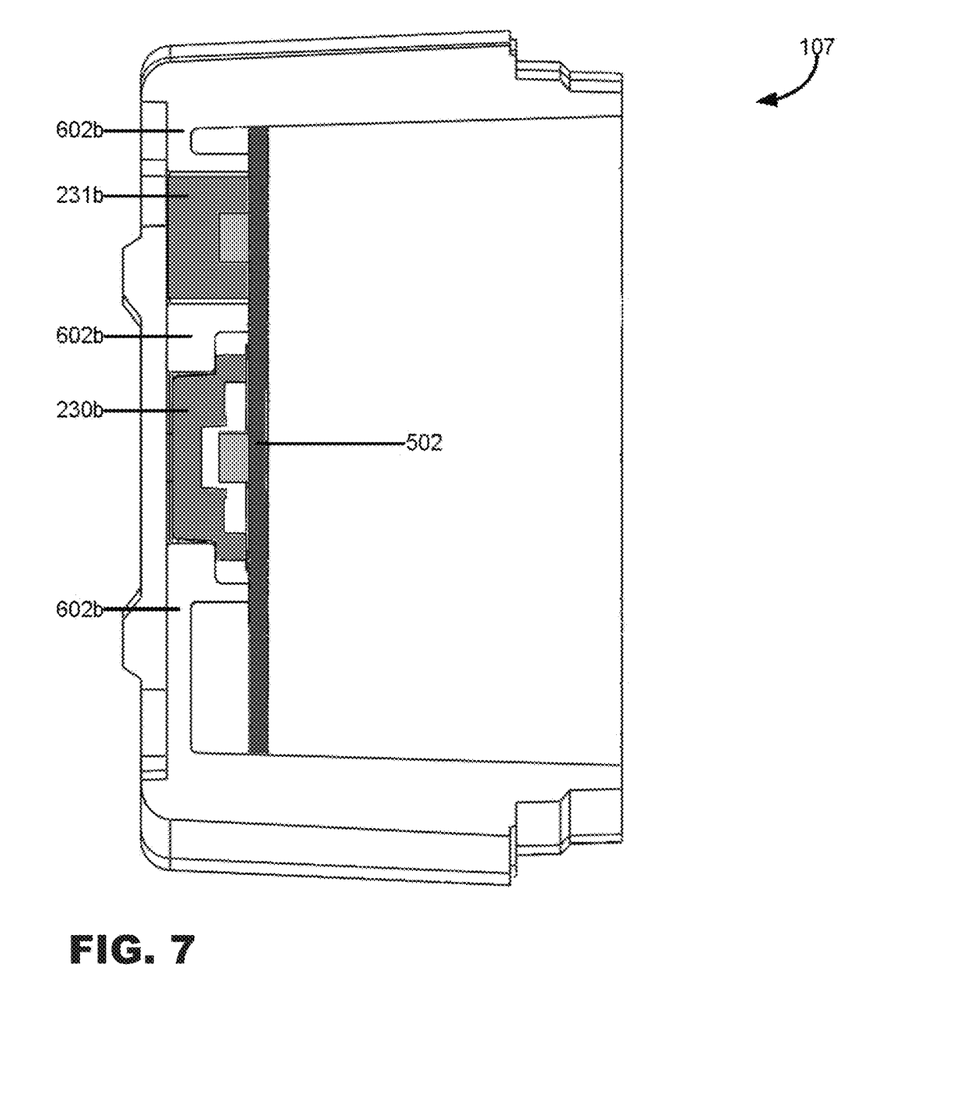
FIG. 7 is a sectional view of the front portion of the camera housing, taken along line 7-7 in FIG. 4.

The intersection between the blocking walls 602 and the PCB 502 is illustrated in FIG. 7, which is a cross-section taken along line 7-7 of FIG. 4. FIG. 7 shows the wide and narrow angle lenslets 230*b*,231*b* and the portions of the blocking wall 602*b* that circumscribe these lenslets 230*b*, 231*b* as the shaded areas above and below the these lenslets 230*b*,231*b*. The PCB 502 is screwed against the columns 604 and accordingly abuts against the blocking walls 602, which prevents light from escaping between the blocking walls 602 and the PCB 502. In alternative embodiments (not depicted), the exposed edges of the blocking walls 602 are covered in a compressible material such as a soft rubber to compensate for any irregularities in the shape of the walls 602 so that the walls 602 and the PCB 502 may remain optically sealed. As light from the IREDs 224 cannot pass through the blocking walls 602 nor, ideally, escape between the blocking walls 602 and either the face 301 or the PCB 502, internal reflections are mitigated.

Figure 8A:
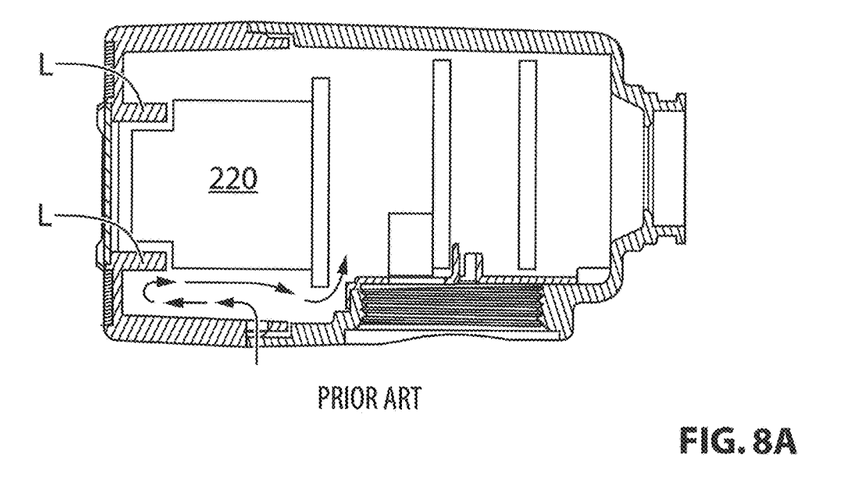
FIG. 8A is a sectional view of a prior art security camera taken along a midline of the camera and looking towards the left side of the camera, showing airflow within the camera.
Figure 8B:
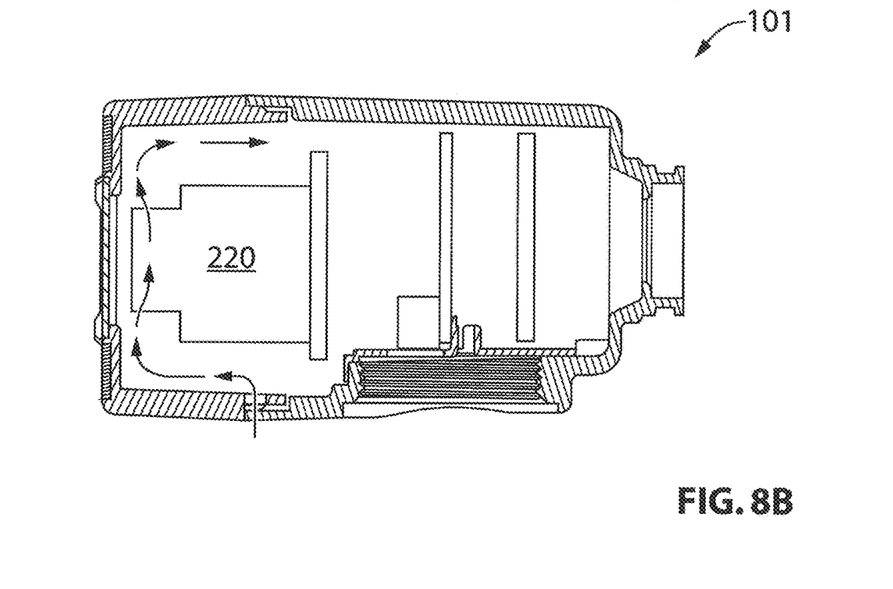
FIG. 8B is a sectional view of the security camera of FIG. 1 taken along a midline of the camera and looking towards the left side of the camera, showing airflow within the camera.

Without the need to shield the imager 218 from internal reflections, the camera 101 can be manufactured without a lens chamber. FIG. 8A shows a sectional view of a prior art camera taken along a midline and looking towards the left side of that prior art camera, showing airflow within the camera, such as past the zoom lens 220. A portion of the lens chamber L that is present to prevent internal reflections from interfering with image acquisition is shown blocking airflow within the camera, which is represented by the arrows. FIG. 8B shows an analogous, simplified sectional view of the camera 101 without the lens chamber L, which use of the blocking walls 602 (previously shown) permit. Air is able to flow in the area formerly occupied by the lens chamber L near the optical aperture 106, thus inhibiting condensation. In another embodiment (not shown), the camera 101 also comprises a fan to further promote circulation.

The camera 101 shown in FIG. 8B permits air from the camera's 101 environment to enter the camera 101. In an alternative embodiment (not depicted), the camera housing 104 may be gaseously sealed to prevent air from the environment from entering the camera 101, which can help prevent condensation that would otherwise result from humid environmental air entering the camera's 101 interior. In embodiments in which the camera 101 is sealed, a fan may or may not be present within the camera to promote air circulation.

It is contemplated that any part of any aspect or embodiment discussed in this specification can be implemented or combined with any part of any other aspect or embodiment discussed in this specification.

While particular embodiments have been described in the foregoing, it is to be understood that other embodiments are possible and are intended to be included herein. It will be clear to any person skilled in the art that modifications of and adjustments to the foregoing embodiments, not shown, are possible.

What is claimed:

1. A video camera, comprising:
   a video camera housing, comprising:
   a housing wall demarcating the interior of the video camera housing, and defining an optical aperture and a first wide angle lenslet aperture;
   a first opaque wide angle blocking wall adjoined to and extending inwardly from the housing wall and circumscribing the first wide angle lenslet aperture;
   a first wide angle lenslet in the first wide angle lenslet aperture and aligned with an infrared ("IR") emitter; the first wide angle lenslet configured to narrowly disperse emissions from the IR emitter;
   a first narrow angle lenslet aperture;
   a first narrow angle lenslet in the first narrow angle lenslet aperture;
   a lens contained within the video camera housing and aligned with the optical aperture to receive light entering the video camera housing through the optical aperture;
   an imager contained within the video camera housing and aligned with the lens to receive light that has passed through the lens;
   circuitry contained within the camera housing communicatively coupled with the imager and operable to operate the video camera, the circuitry comprising a printed circuit board (PCB) on which is mounted a light source positioned to be circumscribed by the opaque blocking wall; and
   a first opaque narrow angle lenslet blocking wall adjoined to and extending inwardly from the housing wall and circumscribing the first narrow angle lenslet aperture.

2. The video camera of claim 1, wherein the PCB abuts against the first opaque narrow angle lenslet blocking wall and has mounted on it the on-camera light source positioned to be circumscribed by the first opaque narrow angle blocking wall.

3. The video camera of claim 2, wherein the opaque narrow and wide angle lenslet blocking walls directly contact each other.

4. The video camera of claim 2, wherein:
   the video camera housing further comprises:
   a second wide angle lenslet aperture and a second narrow angle lenslet aperture; and
   a second opaque wide angle lenslet blocking wall and a second opaque narrow angle lenslet blocking wall, wherein the second opaque wide and narrow angle lenslet blocking walls are adjoined to and extend inwardly from the housing wall and circumscribe the second wide angle and narrow angle lenslet apertures, respectively, and wherein the PCB abuts against the second opaque wide and narrow angle lenslet blocking walls and has mounted on it additional light sources positioned to be circumscribed by the second opaque wide and narrow angle lenslet blocking walls; and
   the video camera further comprises a second wide angle lenslet and a second narrow angle lenslet in the second wide and narrow angle lenslet apertures, respectively.

5. The video camera of claim 4, wherein the first and second wide angle lenslet apertures are on left and right sides of the optical aperture, respectively.

6. The video camera of claim 5, wherein the second opaque narrow and wide angle lenslet blocking walls directly contact each other and do not directly contact the first opaque narrow and wide angle lenslet blocking walls.

7. The video camera of claim 5; wherein the first and second wide angle lenslets have centers separated by approximately 180°, and wherein the centers of the first and second wide angle lenslets and a center of the optical aperture are collinear.

8. The video camera of claim 7, wherein the first and second narrow angle lenslets have centers above and offset approximately 45° from the centers of the first and second wide angle lenslets, respectively.

9. The video camera of claim 8, wherein the wide angle lenslets are rectangular and the narrow angle lenslets are circular.

10. The video camera of claim 9, wherein a threaded column directly contacts the opaque blocking wall, the threaded column being configured to receive a fastener for securing the PCB.

11. The video camera of claim 1, wherein the camera housing is gaseously sealed to prevent air from outside the camera from entering the camera housing.

12. A main portion for containing a video camera, a lens, and an imager; and a front portion; including a camera housing, comprising:
   a face and sides extending from the face for joining to the main portion;
   an optical aperture and a first wide angle lenslet aperture extending through the face; the first wide angle lenslet aperture aligned with an infrared ("IR") emitter, and the first wide angle lenslet aperture containing a first wide angle lenslet configured to narrowly disperse emissions from the IR emitter;
   a first opaque wide angle lenslet blocking wall extending from the face in a direction identical to that in which the sides extend, wherein the first opaque wide angle lenslet blocking wall circumscribes the first wide angle lenslet aperture;
   a first narrow angle lenslet aperture; and
   a first opaque narrow angle lenslet blocking wall adjoined to and extending inwardly from the face, circumscribing the first narrow angle lenslet aperture, and having a height identical to that of the first opaque wide angle lenslet blocking wall.

13. The main portion of claim 12, wherein the opaque narrow and wide angle lenslet blocking walls directly contact each other.

14. The main portion of claim 12, further comprising:
   a second wide angle lenslet aperture and a second narrow angle lenslet aperture; and
   a second opaque wide angle lenslet blocking wall and a second opaque narrow angle lenslet blocking wall, wherein the second opaque wide and narrow angle lenslet blocking walls are adjoined to and extend inwardly from the face, respectively circumscribe the second wide angle and narrow angle lenslet apertures.

15. The main portion of claim 14, wherein the first and second wide angle lenslet apertures are on left and right sides of the optical aperture, respectively.

16. The main portion of claim 15, wherein the second opaque narrow and wide angle lenslet blocking walls directly contact each other and do not directly contact the first opaque narrow and wide angle lenslet blocking walls.

17. The main portion of claim 15, wherein the first and second wide angle lenslets have centers separated by approximately 180°, and wherein the centers of the first and second wide angle lenslets and a center of the optical aperture are collinear.

18. The main portion of claim 17, wherein the first and second narrow angle lenslets have centers above and offset approximately 45° from the centers of the first and second wide angle lenslets, respectively.

19. The main portion of claim 18, wherein the wide angle lenslets are rectangular and the narrow angle lenslets are circular.

20. The main portion of claim 19, wherein a threaded column directly contacts the opaque blocking wall, the threaded column being configured to receive a fastener for securing the PCB.

\* \* \* \* \*